(12) United States Patent
Schneider

(10) Patent No.: US 8,207,857 B2
(45) Date of Patent: Jun. 26, 2012

(54) DETECTION DEVICE

(75) Inventor: Lutz Schneider, Malsch (DE)

(73) Assignee: VERMOP Salmon GmbH, Gilching (DE)

( * ) Notice: Subject to any disclaimer, the term of this patent is extended or adjusted under 35 U.S.C. 154(b) by 843 days.

(21) Appl. No.: 11/666,584

(22) PCT Filed: Oct. 26, 2005

(86) PCT No.: PCT/DE2005/001925
§ 371 (c)(1),
(2), (4) Date: Jan. 6, 2009

(87) PCT Pub. No.: WO2006/045293
PCT Pub. Date: May 4, 2006

(65) Prior Publication Data
US 2009/0212910 A1 Aug. 27, 2009

(30) Foreign Application Priority Data

Oct. 28, 2004 (DE) .......................... 10 2004 052 396
Sep. 16, 2005 (DE) ..................... 20 2005 014 644 U

(51) Int. Cl.
*G08B 13/14* (2006.01)
(52) U.S. Cl. .................. 340/572.7; 340/572.2; 340/551; 343/745; 343/893
(58) Field of Classification Search .... 340/572.1–572.8, 340/551, 10.1; 343/745, 748, 893, 894, 866
See application file for complete search history.

(56) References Cited

U.S. PATENT DOCUMENTS

| | | | | |
|---|---|---|---|---|
| 4,135,184 A | * | 1/1979 | Pruzick | 340/572.5 |
| 4,663,625 A | * | 5/1987 | Yewen | 340/10.42 |
| 5,774,876 A | | 6/1998 | Woolley et al. | |
| 6,094,173 A | * | 7/2000 | Nylander | 343/742 |
| 6,600,441 B2 | | 7/2003 | Liedtke et al. | |
| 2002/0109637 A1 | | 8/2002 | Kitagawa | |
| 2003/0107522 A1 | | 6/2003 | Lauper et al. | |
| 2004/0164864 A1 | | 8/2004 | Chung et al. | |
| 2004/0217866 A1 | * | 11/2004 | Copeland et al. | 340/572.7 |

FOREIGN PATENT DOCUMENTS

| | | |
|---|---|---|
| DE | 44 24 058 C1 | 10/1995 |
| DE | 198 30 584 C2 | 5/1999 |
| DE | 198 24 816 C1 | 9/1999 |
| DE | 200 16 620 U1 | 1/2001 |
| DE | 100 14 542 C2 | 10/2001 |
| DE | 100 50 655 C1 | 1/2002 |
| EP | 1 190 663 B1 | 3/2002 |
| WO | WO 02/088776 A2 | 11/2002 |

* cited by examiner

*Primary Examiner* — Anh V La
(74) *Attorney, Agent, or Firm* — Wolf, Greenfield & Sacks, P.C.

(57) ABSTRACT

The invention relates to a detection device for piece goods, in particular textiles. Starting from the marking of textiles with RFID tags that can be read out with the use of a reader, as is known from the prior art, a detection device for textiles is produced within the scope of the present invention, in which electromagnetic fields of different orientation are generated with the use of at least two antennas arranged at a defined angle to each other, and this ensures that the electronic markings of the piece goods disposed in a counting cage may be reliably read out independently of their relative arrangement in the space.

21 Claims, 2 Drawing Sheets

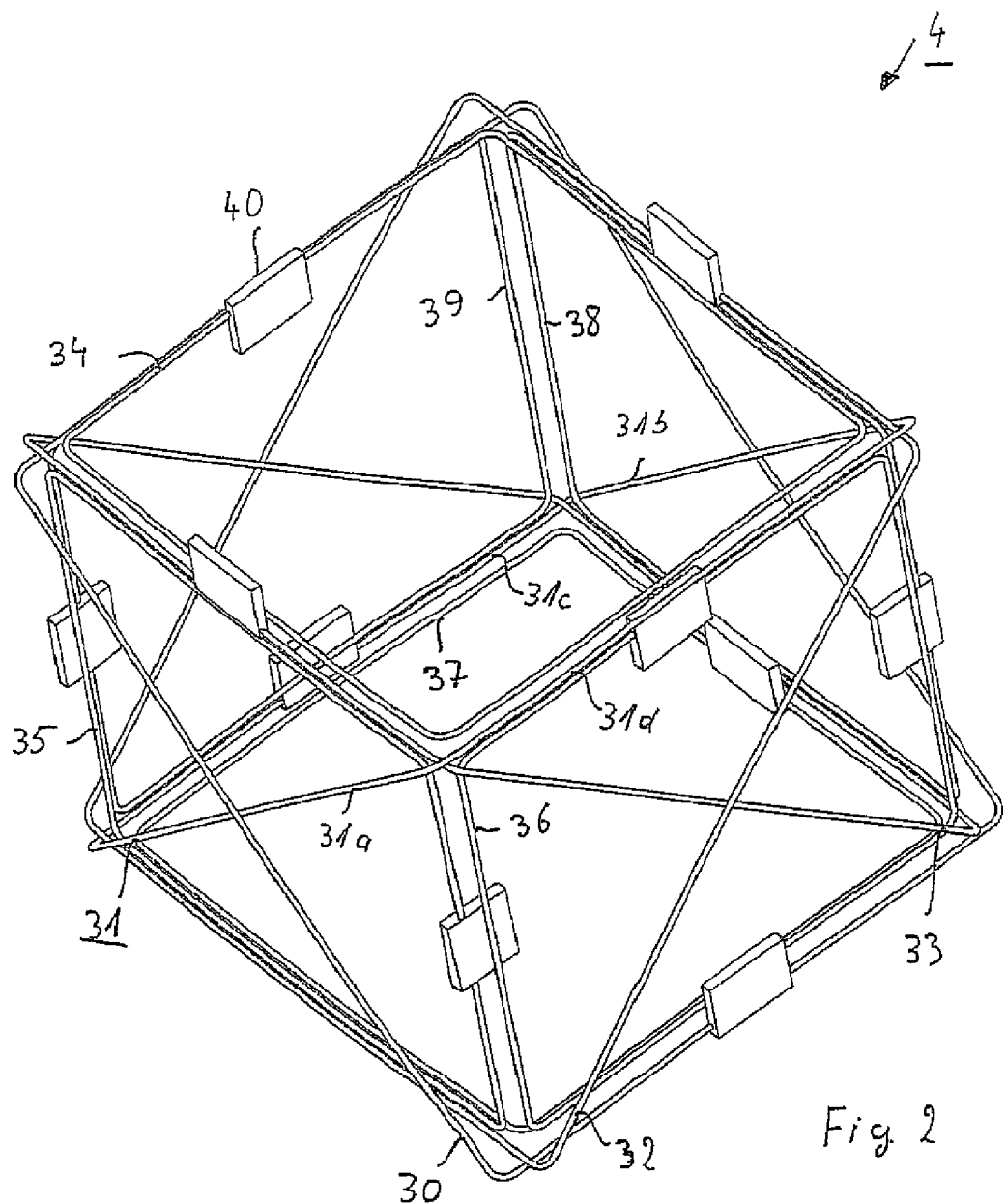

DETECTION DEVICE

FIELD OF THE INVENTION

A detection device for piece goods, preferably textiles and/or textile articles, comprising an antenna device for inductive coupling of an operating voltage into an electronic marking which are in each case captively connected to the piece goods to be counted, and a reading unit for acquiring the signals sent by the electronic markings, as well as a counter connected downstream of the reader for determining the respective number of piece goods by evaluation of the signals of the electronic markings received by means of the reader.

BACKGROUND

Such a detection device for cleaning mops is previously known, for example, from German utility model DE 200 16 620 U1.

The cleaning mop previously known from this document is provided with a cleaning fabric on the side facing the floor to be cleaned in normal use and comprises, in the side end region on the opposite side, a respective open receiving pocket which is formed by means of attached pocket layers, it being possible for the end sections of a preferably foldable mop holder to be inserted into said receiving pockets.

Such cleaning mops have been commercially available for many years and are used to pick up contaminants from flat surfaces, such as floors or walls. Cleaning mops of this type are used, for instance, to clean floors in hospitals or clinics and other medical establishments. There are particularly strict hygiene requirements in these sectors, and thus the cited cleaning mops or mop coverings have to be cleaned and disinfected at prescribed time intervals. The mop cleaning intervals are regulated as a function of the surface that is treated by the respective mop. Firstly, there is therefore the problem that the mop cleaning intervals have to be monitored. Said mops are also only allowed to run through a prescribed number of cleaning intervals before they have to be replaced. A further considerable problem within the context of cleaning said mops accordingly consists in the fact that cleaning very often takes place outside of the cited establishments, in other words in special cleaning facilities. When monitoring the cleaning intervals, there is therefore an additional interest in being able to also detect and check the number of mops. This interest is especially intensified in that in the last few years, it has been found that there has been a virtually inexplicable loss of said mops in said establishments. It is largely unclear whether this loss is to be attributed to the hospital staff employed or to said cleaning establishments or to other causes entirely. This problem could previously only be adequately solved in that the mops handed over for cleaning were counted before dispatch and the cleaned mops counted again once they had been returned. It is understood that counting, in particular of the mops soiled from cleaning, is a time-consuming and not exactly pleasant manual task.

Starting from this prior art, DE 200 16 620 U1 proposes the use of the RFID tags that are known per se. A detailed description of these RFID tags and the engineering achieved in this regard can be found, for instance, in DE 101 55 935 A1.

The RFID (Radio Frequency IDentification) tags substantially consist of contactlessly scannable transponder systems. These are oscillating circuits with a defined resonant frequency. The tag substantially consists in this regard of an antenna coil with one or more windings, which is electrically coupled to a chip. As soon as said antenna coil is brought into the alternating magnetic field of a transmitting antenna, an inductive coupling between the transmitting antenna and the antenna coil of the tag is produced. An electric voltage is induced in the tag by the alternating electromagnetic field, which voltage ultimately ensures the voltage supply of the silicon chip integrated in the circuit, i.e. the so-called "transponder IC". Alternatively, said silicon chip is omitted in the simple 1-bit transponders, and thus the RFID tag is only composed of said antenna coil and an oscillating circuit consisting of a coil and a capacitor, whereby owing to the excitation of this oscillating circuit, preferably with the resonant frequency thereof, the RFID tag for its part measurably weakens the alternating magnetic field generated by the transmitting antenna. Using the 1-bit transponder, the existence of a transponder of this type can substantially only be digitally detected and the contents of a silicon chip with additional individual data, for instance, cannot be read out. 1-bit transponders are used, for example, as an anti-theft device in large stores. In this case it is sufficient to actually detect whether a transponder of this type, which is firmly attached to an item of clothing for example, is moved past a reader, which is usually arranged in the exit region of a large store, in an unauthorised manner—in other words without making a corresponding payment.

This technology is advantageously used according to DE 200 16 620 U1 to count the cited mops. The aforementioned RFID tags are sewn for this purpose into a corresponding receiving pocket of the cleaning mop, the previously known solution not relating to 1-bit transponders but rather to transponders with an integrated memory chip. The data individualising the respective cleaning mop, for example a serial number, the date of manufacture, manufacturer's details, proprietor's details, for instance the name of the hospital, as well as details regarding the first, second and/or last chemical cleaning of the cleaning mop, is assigned to the chip. The memory chip is both readable and writable. For this purpose, the cleaning mop must be guided over a card reading device or over a reading/data input device, respectively.

This solution allows the process of counting the mops in question to be significantly simplified and, moreover, allows said cleaning intervals to be monitored using electronic means. The degree of automation of counting and/or acquiring the data stored in connection with the mops that is to be achieved with a reader of this type is nevertheless kept within limits. To be able to reliably detect an RFID tag arranged in the alternating electromagnetic field of a transmitting antenna, it must firstly be ensured that the distance between the antenna for coupling the operating voltage into the RFID tags and the RFID tag itself is not too large. It is currently assumed, using the field strengths that are still compatible with the surroundings, that the distance between RFID tag and antenna must not be greater than 30 cm.

Furthermore, the RFID tag must be arranged relative to the transmitting antenna while maintaining a specific orientation. The tag with the integrated coil is ideally moved past the reader such that the coil surface surrounded by the coil is moved past the coil surface of the transmitting/receiving antenna so as to be more or less parallel. This ensures that the field lines of the electromagnetic field generated by the transmitting/receiving antenna intersect the coil surface almost orthogonally. In any case, the angle between the coil surface and the surface enclosed by the antenna of the tag should not exceed 45 degrees since otherwise sufficient penetration of the antenna coil surface of the RFID tag, and thus the required inductive coupling into the relevant tag, is no longer ensured. Reliable identification and/or reliable reading out of the RFID tag by the respective transmitting/receiving antenna is no longer ensured in this case.

According to the closest prior art represented by DE 200 16 620 U1, in order to count and check the mops, it is therefore more or less still necessary to move the mops past a transmitting and receiving antenna, for instance by means of a conveyor belt or by hand, such that they are more or less exactly aligned. This is still regarded as being unsatisfactory, in particular in conjunction with a large number of mops.

SUMMARY OF THE INVENTION

The object forming the basis for the invention is therefore to produce a detection device for piece goods, preferably for textiles and/or textile articles, which avoids the aforementioned drawbacks and thereby allows largely fully automatic counting or detection of the piece goods to be counted.

The solution to this object is achieved by a detection device according to the features of the main claim. Advantageous embodiments of the detection device according to the invention can be found in dependent claims 2 to 24.

The fact that the antenna device of the detection device comprises at least two antennas arranged at a, preferably orthogonal, angle to one another ensures that a plurality of electromagnetic fields of different orientation in each case is generated in a space. This in turn ensures that, independently of the respective orientation of the, preferably textile, piece goods to be counted, the RFID tags are intersected at least by the field lines of one of the involved fields and therefore the conditions necessary for activating the electronic marking are created. Owing to the detection device according to the invention, a specific spatial orientation of the piece goods and the electronic markings captively connected thereto is no longer decisive. The detection device works reliably even with a random arrangement of the piece goods in a space.

The antennas of the antenna devices consist of electrical conductors for generating an alternating electromagnetic field at a defined frequency. An alternating field is normally generated at 13.56 MHz.

In an advantageous embodiment, the detection device is provided with a counting cage, the individual antennas of the antenna devices overlapping the counting cage on at least two sides. Dimensioning the counting cage as a function of the field strength of the fields of the antennas used ensures that at least the electronic markings of the piece goods received in the counting cage may be activated and read out.

In an advantageous embodiment, the counting cage is cuboidal and comprises a floor plate that is delimited by four side walls, said counting cage being open towards the top. This enables the piece goods to be simply dropped or placed into the counting cage from the top before actual counting begins so that they can be detected. The detection device comprises an antenna device having two, preferably four, diagonal antennas, with each of the diagonal antennas including at least one, however preferably two, diagonal sections. These diagonal antennas are each assigned to one, preferably two, side walls of the counting cage. The name of the diagonal antennas and the diagonal sections of the diagonal antennas stems from the fact that in the diagonal section, these antennas each extend diagonally over the corresponding side wall. It has been shown that in the case of a random arrangement of piece goods in the counting cage, such diagonal antenna arrangements constitute a particularly advantageous arrangement since they ensure optimal field penetration in the case of randomly arranged piece goods and thus achieve these results alone, which although are not 100 percent accurate, are sufficiently accurate for many applications. If the piece goods are provided with RFID tags, a sufficiently accurate counting result with an error quotient of 5 to 10%, which is sufficient for most applications, can already be provided with 2 or 4 diagonal antennas. The fewer antennas there are, the fewer tuning problems there are and the quicker the counting results. The arrangement of two or ideally four diagonal antennas each with two diagonal sections, with each diagonal section being assigned to a side wall, thus represents a particularly advantageous and simple embodiment of the antenna device of the detection device according to the invention.

As an alternative to the closed cuboid shape, a further solution regarding the construction of the counting cage is to leave it open on two opposite sides and to hang the counting cage such that it is moveable per se. An embodiment is particularly preferred here, in which the counting cage can be moved vertically and the sides of the cuboid that are horizontal in this position are open. In this embodiment, counting is made possible in that a container holding the piece goods to be counted is placed underneath the counting cage, which is then lowered over the container such that the antenna device of the counting cage surrounds the container. The piece goods thus do not have to be reloaded again, but can rather remain in the container provided, for example, by the laundry.

In a specific development, the diagonal antennas are configured such that they each include two diagonal sections that are connected by two transverse members preferably arranged in the region of opposite edges of the cuboidal counting cage. Such a geometric arrangement ensures that the geometry of the counting cage is not affected by the diagonal antennas and thus a particularly easy anchoring of the diagonal antennas with the counting cage is possible.

A diagonal orientation of the generated fields is advisable also in the region of the diagonal antennas, and thus it is expedient for a pair of diagonal antennas or a pair of diagonal sections, which preferably intersect at an angle of at least approximately 90°, to be assigned to each side wall.

A further improvement in the counting result of the piece goods that can be achieved with the detection device can be obtained by additionally upgrading the antenna device by providing it with six further so-called frame antennas in addition to the aforementioned diagonal antennas. The frame antennas are substantially assigned to the x, y and z axes of the counting cage in such a manner that each frame antenna substantially surrounds a limiting surface of the counting cage. There are six frame antennas since two frame antennas are assigned to each orthogonal orientation, i.e. the x, y and z direction. These are normally one of each of a transmitting antenna and a receiving antenna.

The combination of the described diagonal and frame antennas in conjunction with the also described arrangement achieves an almost 100% accurate counting result for a random arrangement of piece goods having an electronic marking, preferably an RFID tag, inside the counting cage. The reason for this is that owing to the particular geometric arrangement of the antennas of the antenna device, it is ensured that the electronic markings or cited RFID tags are in any case penetrated to the required extent and angle by the field lines of the transmitting field.

In order to be able to achieve an overall tuning of the antenna device, it is, however, necessary for each antenna of the antenna device to be assigned at least one separate electronic tuning means.

In the case of the use of passive electronic markings, i.e. in particular RFID tags, which is preferred herein, it is necessary for the antenna device to comprise both transmitting and receiving antennas, with a receiving antenna being assigned to each transmitting antenna, and the two together forming in each case a transmitting/receiving antenna pair.

It has shown in practice that if the antennas are supplied with power at the same time, this results in almost insurmountable couplings and antenna detunings which are in turn reflected by undesirable errors in the counting result. These attenuating and detuning effects of the antennas can be effectively eliminated in that the antennas can be independently supplied with power via a multiplexer and thus a decoupling of the counting results of the individual antennas is also possible.

This effect is additionally enhanced in that the antennas are electrically separated by means of switching elements, for example, relays. An oscillation in the effective range of 13.56 MHz is thereby prevented and coupling of disturbing effects into adjacent antennas is avoided.

The multiplexer operation of the antennas is ideally organised by means of a central control unit of the detection device in such a manner that the transmitting antennas controlled via the multiplexer are supplied with power one after the other and the counting results received by the receiving antennas assigned to the respective transmitting antennas are detected one after the other. Switching through channel for channel and thus antenna for antenna occurs via the multiplexer and in each case the counting result detected on average for an antenna is detected, the adding up of the counting results then leading to the total number of piece goods contained in the counting cage.

It has also proven worthwhile to provide the detection device with so-called duplicate recognition, whereby not only the fact that a piece good has been identified is detected by the reader, but at the same time an individual identification assigned to each electronic marking of the piece goods is detected and evaluated in such a manner that the counting result is reduced by the number of duplicates that can be identified in this manner. When switching through the channels in the multiplex operation and gradually adding up the actual counting results, only those detected piece goods not already counted during a previous measurement are included in the counting result. This also makes a considerable contribution to the accuracy of the counting result that can be achieved.

A common problem as regards the operation of antennas is the connection thereof via a coaxial cable, in this case at the multiplexer. As a result, an asymmetric signal is transmitted to the symmetrically configured circuit via the coaxial cable, however the problems relating to antenna detuning occurring as a result hereof can be solved by inserting so-called baluns. The insertion of baluns represents circuit engineering that is known per se in the field of token ring technology.

In an advantageous embodiment, the detection device comprises a data processing means having a storage member so that the measurement results can be recorded and stored for a predetermined period of time by the data processing means in the sense of a data logger. This protocol function is decidedly helpful in particular when prosecuting theft.

Further sensors such as, for example, a moisture meter and/or a temperature detecting device, can additionally be added to the detection device. Possible sources of error in the measurement can be identified by means hereof. It may also be helpful for this reason to record the transmitting powers of the transmitting antennas used for the respective measurement in conjunction with the measuring result.

In an advantageous embodiment, the counting cage and the antenna device are each provided with a fixed part and a detachable part. Filling of the antenna cage and dismantling thereof can be simplified in this manner.

A precise tuning of the receiving antennas to the transmitting antennas and to the in each case quite different environmental conditions when using the detection device is made possible in that a receiving amplifier is allocated to each receiving antenna.

A more or less automatic tuning of the receiving amplifiers is made possible in that the central control device controls the receiving amplifiers of the receiving antennas as a function of the input level of the transmitting/receiving antennas.

In a specific embodiment, the detection device is used in particular for detecting mops placed in the counting cage in a simple manner. An RFID tag can be introduced into the mops as an electronic marking, the RFID tags normally being captively incorporated in sealed receiving pockets of the mops or the piece goods to be counted.

The transmitting/receiving antennas with a plurality of, preferably two, coils arranged in parallel are connected to the fixed part of the counting cage, whereas the simple receiving antennas are connected to the separable part of the counting cage.

The receiving antennas are additionally connected to a receiving amplifier to attain greater sensitivity of the antenna device for the signals sent by the electronic markings. The amplifier allows lower field strengths to be used to activate the electronic markings.

In another advantageous embodiment, the amplification factor of the receiving amplifier is selected as a function of the input level of the transmitting/receiving antenna, i.e. with correspondingly greater bit strength, the receiving amplifier may, if necessary, be adjusted downward to activate electronic markings.

In the case of the embodiment of the electronic markings as intelligent RFID tags with an integrated chip, monitoring of the cleaning intervals and other individual features may take place at the same time as counting.

BRIEF DESCRIPTION OF THE DRAWINGS

The invention will be described in more detail below by means of an embodiment illustrated only schematically in the drawings, in which:

FIG. 2 shows a perspective view of the antenna device of the detection device shown in FIG. 1 in the closed state.

DETAILED DESCRIPTION

Figure 1:
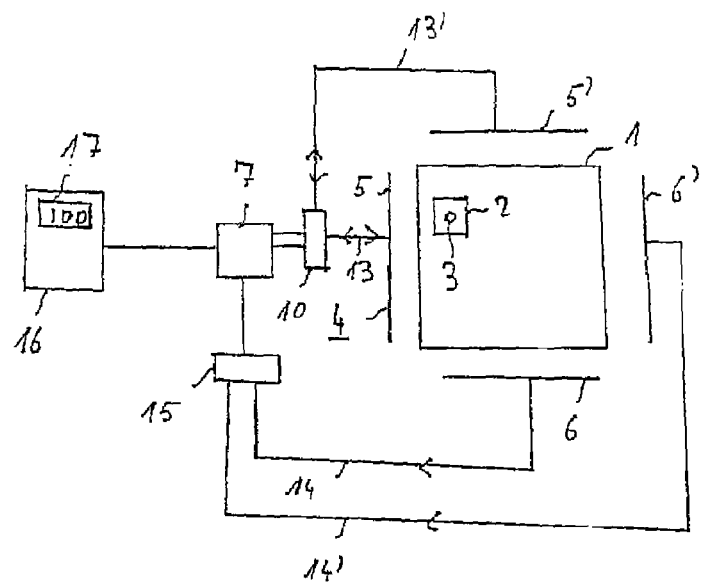
FIG. 1 shows a basic circuit diagram of a detection device with an antenna device.

According to the illustration in FIG. 1, the detection device comprises a counting cage 1 for receiving a container with piece goods 2 to be counted, which are provided with a contactlessly evaluatable electronic marking 3. The electronic marking 3 is preferably a transponder or an RFID tag. RFID tags are understood as passive oscillating circuits in which a silicon chip with a data storage medium is arranged. The oscillating circuit may be supplied with power via a transmitting antenna by the active coupling of an operating voltage into an alternating electromagnetic field. The inductive coupling then provides the operating voltage required for the silicon chip, which then transmits the stored data to a receiving antenna.

In the present case, an antenna device 4 is associated with the counting cage 1 for this purpose, said device comprising transmitting/receiving antennas 5, 5' and two pure receiving antennas 6, 6'. The antennas 5, 5' and 6, 6' are arranged in the space with different orientations. In the present case, they are permanently connected to the side walls of the counting cage 1 in a manner that is not shown in more detail here. This ensures that the piece goods 2 disposed inside the counting cage 1 are exposed to a plurality of electromagnetic fields of different orientation. This in turn ensures that the piece goods 2, independently of their random orientation in the space or, more precisely, in the counting cage 1, are in each case penetrated by the field lines of the electromagnetic fields generated by means of the transmitting/receiving antennas 5, 5' such that the required operating voltage is reliably coupled into each RFID tag disposed inside the counting cage 1. This in turn ensures that the signals sent by the RFID tags may be reliably received by both the receiving antennas 6, 6' and the transmitting/receiving antennas 5, 5'.

The transmitting/receiving antennas 5, 5' are controlled by a common central control device 7 by way of a multiplexer 10. The multiplexer 10 is connected to a transmitting channel 11 and receiving channel 12 of the central control device 7. The multiplexer 10 is data-connected in each case by means of a bidirectional data connection 13, 13' to the connected transmitting/receiving antennas 5, 5'. The pure receiving antennas 6, 6' are on the other hand connected to the central control unit 7 via a unidirectional data connection 14, 14' by way of an additional multiplexer 15.

The alternating electromagnetic field required for coupling of the required operating voltage is first of all generated by the transmitting/receiving unit 5, 5'. After the field has been switched off, the tags transmit the data contained in the chips for identifying the piece goods 2, which data is received by the antennas 5, 5', 6, 6' of the antenna device 4 and is transmitted to the central control device 7 for further evaluation. A counter 16 for displaying the counting result is assigned to the central control unit 7. The counter 16 has a display device 17 for this purpose.

A perspective view of the specific embodiment of the antenna device 4 is shown in FIG. 2. The antenna device 4 substantially consists of four diagonal antennas 30, 31, 32 and 33 as well as six frame antennas 34 to 39. The diagonal antennas thereby each consist of two diagonal sections 31*a* and 31*b*, that are connected with one another by transverse members 31*c* and 31*d*, as is shown, for example, for diagonal antenna 31 in FIG. 2. The other diagonal antennas 30, 32 and 33, have an analogous construction.

The antenna device 4 thereby comprises a counting cage that is not shown in more detail in FIG. 2 and which normally has four side walls and is hung so as to be vertically moveable. The frame antennas 34 to 39 each surround the limiting surfaces of the cuboidal counting cage. The diagonal antennas are arranged such that the transverse members are each arranged in the region of the edges of the cuboid, with the length of the transverse members 31*c* and 31*d* slightly exceeding in each case the length of the limiting edges of the counting cage such that the diagonal sections 31*a* and 31*b* are respectively arranged outside of the side walls of the counting cage 1. The diagonal antennas 31 to 33 are assigned to the counting cage 1 in such a manner that two diagonal sections intersecting at an angle of 90° are assigned to each side wall of the counting cage 1.

An individual tuning device 40 is assigned to each individual antenna 30 to 39. The geometric arrangement of the antenna device shown in a perspective view in FIG. 2 can be better understood from the separated view in FIG. 3. As is indicated by the plus sign in FIG. 3, the antenna device 4 thus consists of the arrangement of the frame antennas in the left-hand illustration and the arrangement of the diagonal antennas in the right-hand illustration.

Figure 3:
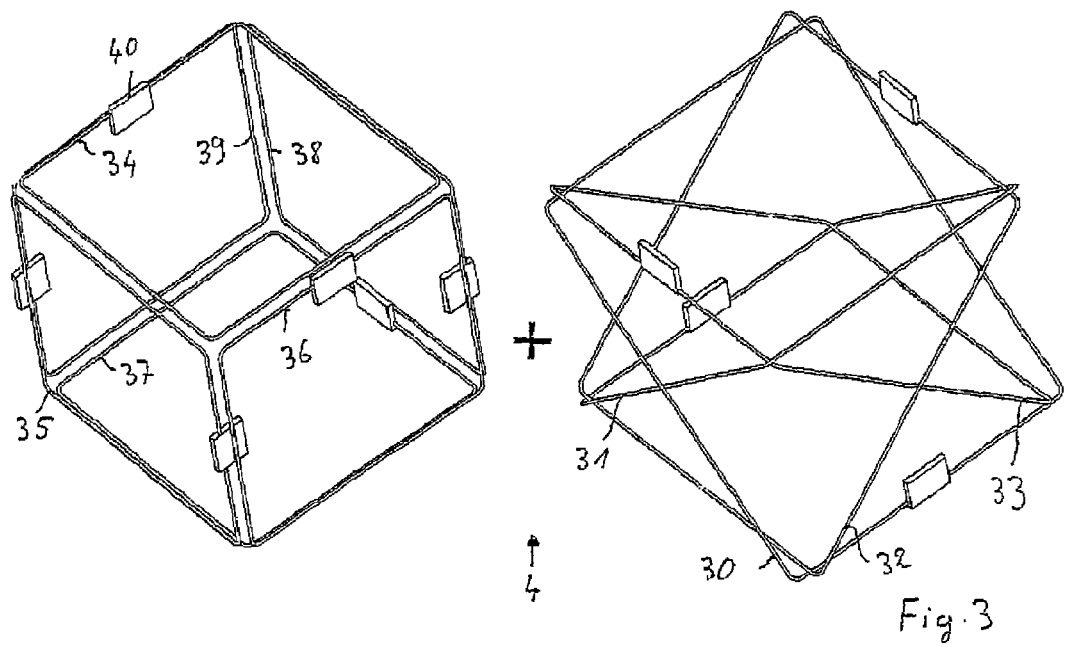
FIG. 3 shows a separate perspective view of both the frame antennas and the diagonal antennas of the antenna device of the detection device shown in FIG. 1.

The function of the antenna device in FIGS. 2 and 3 is explained below again in context.

As already explained above, in order to detect piece goods that have been labelled with RFID tags, it is necessary for the induction loop contained in the RFID tags to be penetrated by the field lines of the transmitting antennas at least at an angle of 45° to the coil surface distinguished by the coil of the RFID tag. This can only be achieved in the case of a random and disorderly arrangement of piece goods if a plurality of field lines are arranged at an angle to one another. Practical experiments have shown that very good counting results can be already achieved with a diagonal arrangement having only two diagonal antennas that are in an appropriate arrangement with respect to one another. However, in a further improvement, it is advisable to select an arrangement with four diagonal antennas in accordance with FIG. 3. With this arrangement, accuracies are achieved in connection with the above-explained mop counting in a counting cage 1, as shown in FIG. 1, whose deviation lies in the single-figure percentage range.

In most cases, such a mop result should be entirely satisfactory. The counting result can be further improved by adding an arrangement of frame antennas according to the left-hand illustration in FIG. 3 to the arrangement of the diagonal antennas according to the right-hand illustration in FIG. 3.

The antennas each have to be understood as antenna pairs of transmitting and receiving antennas. The passive oscillating circuits of the RFID tags are inductively supplied with power by means of the transmitting antennas, with this excitation of the inductive oscillating circuits of the RFID tags being sufficient to activate these, for their part, as transmitters so that the chip identifications contained in the RFID tags are inductively transmitted. These inductive RFID identifications can then be evaluated using the receiving antennas and supplied to a further data collection device. In the case of an antenna device according to FIG. 2, an almost 100% counting result is achieved for the principal object within the framework of the invention, i.e. mop counting. The individual antennas are operated in this case via a multiplexer that assigns an individual channel to each antenna of the antenna device 4 such that the transmitting antennas can be supplied with power one after the other by the multiplexer. The receiving antennas are accordingly also activated one after the other, and thus the correct counting result is achieved in that the counting results of the individual receiving antennas are added up. The detection device is ideally provided with duplicate recognition, which also evaluates the individual identifications of the RFID tags and thereby determines whether an RFID tag has already been detected in connection with a previous count. Such duplicates are not included in the further counting result and thus errors due to corresponding duplicate counts are effectively avoided.

In an advantageous embodiment, the detection device can be provided with further sensors such as a temperature meter or moisture meter, which can be of additional importance in connection with the detection of the counting conditions, and also of the state of the mops. The arrangement is normally operated in conjunction with a storage member that records the measurements and the circumstances thereof. The recording of the counting results is important to thus be able to pursue in a targeted manner possible notices of loss for example in the entrance area of laundries and the like.

In contrast to the prior art, the advantage of the detection device according to the invention lies in the fact that the device in question also works reliably with a random arrangement of the piece goods 2 inside the counting cage 1.

LIST OF REFERENCE NUMBERS 1 counting cage
2 piece goods
3 electronic marking
4 antenna device
5, 5' transmitting/receiving antennas
6, 6' receiving antennas
7 central control device
10 multiplexer
11 transmitting channel
12 receiving channel
13, 13' bidirectional data connection
14, 14' unidirectional data connection
15 additional multiplexer
16 counter
17 display device
31a, 31b diagonal sections
31c, 31d transverse members
30 to 33 diagonal antennas
34 to 39 frame antennas
40 tuning element

The invention claimed is:

1. Detection device for piece goods comprising an antenna device for inductive coupling of an operating voltage into at least one electronic marking which are in each case captively connected to the piece goods to be counted, and a reading unit for acquiring the signals sent by the electronic markings, as well as a counter connected downstream of the reader for determining the respective number of piece goods by evaluation of the signals of the electronic markings received by means of the reader, wherein the antenna device for generating two respective electromagnetic fields of different orientations comprises at least two separate antennas which are arranged at a defined angle to each other, wherein the antenna device assigned to said detection device comprises four diagonal antennas, each having two diagonal sections, two intersecting diagonal sections are assigned to each side wall of a counting cage, and the opposite diagonal sections of opposite side walls are aligned in parallel to one another and combined to form one diagonal antenna, the diagonal sections of the diagonal antenna being connected by two transverse members.

2. Detection device according to claim 1, wherein each antenna of the antenna device comprises an electrical conductor, said conductor being shaped such that it forms at least approximately a closed frame.

3. Detection device according to claim 1, wherein an at least partially closed counting cage for receiving the piece goods to be counted is assigned to said detection device, the antenna device overlapping said counting cage on at least two sides.

4. Detection device according to claim 3, wherein the cuboidal counting cage comprises a floor plate and four side walls and is open towards the top.

5. Detection device according to claim 1, wherein the counting cage which hangs so as to be moveable and which is open on two opposite sides is assigned to said detection device.

6. Detection device according to claim 3, wherein the antenna device assigned to the counting cage comprises six further frame antennas, each frame antenna being assigned to a limiting surface of the counting cage, i.e. the four side walls, the floor plate and the open top surface of the counting cage, in such a manner that each frame antenna at least substantially surrounds the respective limiting surface.

7. Detection device according to claim 6, wherein at least one separate electronic tuning means is assigned to each antenna of the antenna device.

8. Detection device according to claim 6, wherein the antennas of the antenna device comprise transmitting and receiving antennas, a receiving antenna being assigned to each transmitting antenna such that together they form a transmitting/receiving antenna pair.

9. Detection device according to claim 8, wherein the antennas can be independently supplied with power by means of a multiplexer.

10. Detection device according to claim 9, wherein the antennas can be electrically separated by means of at least one switching element in each case.

11. Detection device according to claim 9, wherein a separate input and output channel of the multiplexer is assigned to each transmitting and receiving antenna pair.

12. Detection device according to claim 9, wherein said detection device comprises a central control unit, by means of which the transmitting antennas controlled via the multiplexer can be supplied with power one after the other and the counting results detected by means of the receiving antennas are determined one after the other.

13. Detection device according to claim 11, wherein duplicate recognition is assigned to a central control unit, which, by evaluating the signals of the electronic markings received by the reader, in particular the individual identification assigned to each electronic marking, recognises any possible repeat counts of the receiving antennas evaluated one after the other and reduces the counting result by the number of these duplicates.

14. Detection device according to claim 9 wherein the antennas of the antenna device are each connected to the multiplexer via a coaxial cable with insertion of a balun in each case.

15. Detection device according to claim 9, wherein said detection device comprises a data processing means having a storage member which, in its function as a data logger, records and stores the measurement results for a predeterminable period.

16. Detection device according to claim 15, wherein in addition to the antenna device, said detection device comprises at least one moisture meter and/or at least one temperature detecting device, which are each also data-connected with the data processing means.

17. Detection device according to claim 15, wherein the transmitting power used by each of the transmitting antennas can be detected and stored for each measurement by means of a data collection device.

18. Detection device according to claim 3, wherein the counting cage and the antenna device each have a fixed part and a detachable part, the fixed part of said counting cage being connected to the fixed part of said antenna device and the detachable part of said counting cage being connected to the detachable part of said antenna device, respectively.

19. Detection device according to claim 8, wherein the receiving antennas of the antenna device are each connected to a receiving amplifier.

20. Detection device according to claim 19, wherein a central control device controls the receiving amplifier as a function of the input level of the transmitting/receiving antennas.

21. Detection device according to claim 1, wherein the piece goods to be counted are each provided with at least one RFID tag as an electronic marking, each RFID tag being captively received in a sealed receiving pocket of the piece good.

* * * * *